(12) United States Patent
Tsai

(10) Patent No.: US 7,754,345 B2
(45) Date of Patent: Jul. 13, 2010

(54) FAR INFRARED EMITTING NANO GLAZE

(76) Inventor: Jih-Hsin Tsai, No. 22, Lane 67, Yingtao Rd., Yingge Township, Taipei County (TW)

(*) Notice: Subject to any disclaimer, the term of this patent is extended or adjusted under 35 U.S.C. 154(b) by 288 days.

(21) Appl. No.: 11/976,307

(22) Filed: Oct. 23, 2007

(65) Prior Publication Data
US 2008/0220960 A1 Sep. 11, 2008

Related U.S. Application Data

(63) Continuation-in-part of application No. 10/867,666, filed on Jun. 16, 2004, now abandoned.

(51) Int. Cl.
*B32B 18/00* (2006.01)
*C03C 8/00* (2006.01)
*C03C 8/14* (2006.01)
*C03C 8/18* (2006.01)
*C04B 41/86* (2006.01)
*B05D 5/00* (2006.01)

(52) U.S. Cl. ............... 428/689; 252/587; 427/229; 427/376.2; 428/697; 428/702; 501/17; 501/19; 501/21

(58) Field of Classification Search ............ 501/21, 501/17, 19; 252/587; 428/689, 697, 702; 427/229, 376.2
See application file for complete search history.

(56) References Cited

U.S. PATENT DOCUMENTS 6,548,118 B1 * 4/2003 Yu .................. 427/376.2

FOREIGN PATENT DOCUMENTS

JP 61-286262 A * 12/1986
JP 58-167483 A * 10/1987
JP 63-117928 A * 5/1988
JP 11-35340 A * 2/1999

OTHER PUBLICATIONS

Derwent Abstract No. 1994-064293, abstract of Taiwan Patent Specification No. 217999A (Dec. 1993).*
Derwent Abstract No. 2002-326559, abstract of Korea Patent Specification No. 2001084983A (Sep. 2001).*
Derwent Abstract No. 2003-145417, abstract of Korea Patent Specification No. 387414B (Jun. 2003).*
Derwent Abstract No. 2004-227715, abstract of China Patent Specification No. 1463940A (Dec. 2003).*
Derwent Abstract No. 2003-195925, abstract of Korea Patent Specification No. 414467B (Jan. 2004).*
Derwent Abstract No. 2004-105154, abstract of Korea Patent Specification No. 476551 B (Mar. 2005).*
Derwent Abstract No. 2006-656925, abstract of Korea Patent Specification No. 2005110849A (Nov. 2005).*
Derwent Abstract No. 2005-598462, abstract of China Patent Specification No. 1609061A (Apr. 2005).*
Derwent Abstract No. 2003-382756, abstract of China Patent Specification No. 1394828A (Feb. 2003).*

* cited by examiner

*Primary Examiner*—Anthony J Green
(74) *Attorney, Agent, or Firm*—Jackson IPG PLLC

(57) ABSTRACT

A far infrared emitting nano glazed comprised of a mixture of 35~65% solvent, 1~35% solubilizing agent, 0~25% refractory agent but not including 0%, 0.1~5% adhesive agent, 0.5~30% far infrared powder, and 0.5~10% nano material, added with water to be ground into a solution with of 350±20 g/200 cc concentration and 200~325 mesh fineness; then applied to surface of ceramic body or biscuit and then sintered at 1120° C.~1350° C. into a finished ceramic product provided with far infrared function and nano characteristics to maintain clean, bright and attractive surface, antibiotic and activate the substance contained therein.

8 Claims, 1 Drawing Sheet

FAR INFRARED EMITTING NANO GLAZE

This application is a continuation-in-part of U.S. Ser. No. 10/867,666, filed Jun. 16, 2004, now abandoned, the disclosure of which is incorporated herein by reference in it entirety.

BACKGROUND OF THE INVENTION (a) Field of the Invention

The present invention is related to a far infrared emitting nano glaze, and more particularly, to a glaze that covers over the surface of a ceramic raw body or biscuit to be sintered together with the ceramic material into a glaze that gives far infrared emitting and nano characteristics for the ceramic product to keep the surface of the ceramic product clean and attractive, prevent attachment and propagation of virus and bacteria, and upgrade the function of the substance contained in or passing through the ceramic product by constantly activating the molecular characteristics of the substance. The term "nano" as used herein describes a nanosized material which is less than 100 nanometers.

(b) Description of the Prior Art

Whereas ceramic products generally applied in containers for the edibles, constructional materials, and sanitary ware are essentially having ceramic grains of clay, feldspar, and quartz mixed, ball ground, molded and sintered into ceramic body, the surface of the body will faithfully reflect the roughness of the mold and the size and appearance of the ceramic grains, that is, the greater of the initial grain, the rougher the surface gets.

A glaze (A) is usually coated to the surface of the ceramic product as illustrated in FIG. 1, wherein, key compositions of the raw materials of the glaze (A) are similar to those of the body or the biscuit (B). Upon the completion of the sintering process, the resultant containment of the glass in the glaze becomes higher; in turn, a smooth and bright surface of the body is achieved due to the flow of the vitreous phase. Furthermore, pigment is usually added into the glaze to produce various colors other than the inherited yellowish body for developing attractive appearance.

However, similar to the preparation of the ceramic raw materials, the preparation of the glaze also has to undergo mixing and ball grinding. Therefore, the roughness on the surface of the glaze is vulnerable to the size of the raw material of the glaze, thus to the roughness of the surface of the body. During the sintering process, both of the body and the glaze surface tend to shrink to develop defectives including pit and pinhole where can easily become the bed for the propagation of contaminants and bacteria. Those contaminants and bacteria will continue to accumulate and reproduce to contribute a dirty surface of the ceramic product and constant brushing and acid bath are required for removing those contaminants and bacteria, making maintenance difficult and inconvenient.

To correct the problem, spray of optical catalyst on the surface of the ceramic product presents a solution in the hope that hydroxyl free radicals will be developed under the exposure to the emission of ultra-violet light that are sufficient to destroy the structure of the virus. However, this solution fails to achieve it expected purpose of preventing the diffusion of the virus for reasons that the sterilization offered by the solution will disappear upon the disengagement of the optical catalysis, that the sterilization only prevails when exposed to the UV emission; and that the sterilization is comparatively passive than the antibiotic purpose.

Another solution generally practiced in the market involves the addition of far infrared powder into the ceramic appliance for the ceramic appliance to provide the far infrared emission results by forthwith mixing massive far infrared powders into the ceramic raw materials, thrown and sintered into tableware for the ceramic tableware to effectively emit far infrared wave and fill up the pits on the surface of the ceramic tableware to effectively separate water. However, the far infrared powder is made of metal such as iron, manganese, copper or chrome; therefore, the finish color of the tableware is limited to very few dull and dark colors, making application of versatile colors impossible.

SUMMARY OF THE INVENTION

The primary purpose of the present invention is to provide a far infrared emitting nano glaze that constantly and effectively keep the surface of ceramic product smooth, bright and attractive, provide the antibiotic function by preventing the attachment and propagation of virus and bacteria, and upgrade the function of the substance contained in or passing through the far infrared emitting ceramic product by constantly activating the molecular characteristics of the substance. To achieve the purpose, the present invention is comprised of a mixture of 35~65% solvent, 1~35% solubilizing agent, 0~25% refractory agent but not including 0%, 0.1~5% adhesive agent, 0.5~30% far infrared powders, and 0.5~10% nano materials, added with water to be ground into a glaze at the concentration of 350±20 g/200 cc and a fineness of 200~325 mesh. The present invention is coated to the surface of the ceramic body or biscuit and sintered at 1120° C.~1350° C. into a finished ceramic product provided with far infrared emitting function and nano characteristics.

DETAILED DESCRIPTION OF THE PREFERRED EMBODIMENTS

Figure 1:
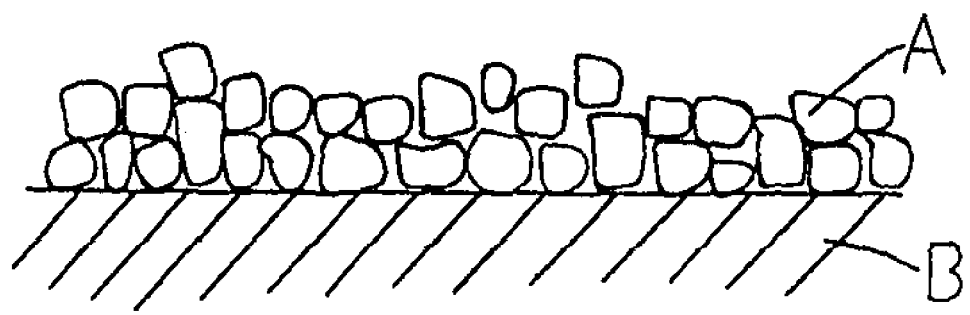
FIG. 1 is a schematic view showing that a ceramic glaze of the prior art is sprayed onto the surface of a ceramic body.

A far infrared emitting nano glaze (far infrared emitting glaze) of the present invention essentially contains the following compositions:

A. Solvent: comprised of feldspar, boron or quartz; wherein, boron is made available from boric acid, borax, boron silicate or boric compound; and the containment of the solvent in the present invention is 35~65%;

B. Solubilizing agent: may be comprised of calcium carbonate, barium carbonate, lithium carbonate, magnesium carbonate, zinc oxide, or talc; and the containment of the solubilizing agent in the present invention is 1~35%;

C. Refractory agent: may be comprised of kaolin, or silica; and the containment of refractory agent in the present invention is 0~25% but not including 0%;

D. Adhesive agent: may be comprised of silicon dioxide (38.42%), magnesium oxide and boron silicate (17.13%), sapphire (0.69%), ferric oxide (0.11%), calcium oxide (3.25%), sodium oxide (4.96%), potassium oxide (0.07%), lithium oxide (0.72%), and inorganic epoxy (24.84%); and the containment of the adhesive agent in the present invention is 0.1~5%);

E. Far infrared powder: the far infrared powder mainly is a natural mineral, and the major matter of such mineral can emit a far infrared radiation. The far infrared powder is related to the element of zirconium (Zirconium dioxide, $ZrO_2$), and the containment of the far infrared powder in the present invention is 0.5~30%. The far infrared powder also is selected from the group consisting of $Al_2O_3$, MgO, NiO, ZnO, $SnO_2$, $TiO_2$, $CaCO_3$, ZrC, SiC, $SiO_2$ and zirconium silicate; and F. Nano powder: may be of the compound of silver, silicon, aluminum, potassium, magnesium, calcium, titanium, iron and lithium or their oxides; and the containment of the nano powder in the present invention is 0.5~30%.

Accordingly, all the solvent, solubilizing agent, refractory agent, adhesive agent, far infrared powder described above are mixed at proper parts, and added with water a volume 0.6~1.5 times of that of the glaze to be fully ground into a glaze (1) at the concentration of 350±20 g/200 cc and fineness of 200~325 mesh.

Figure 2:
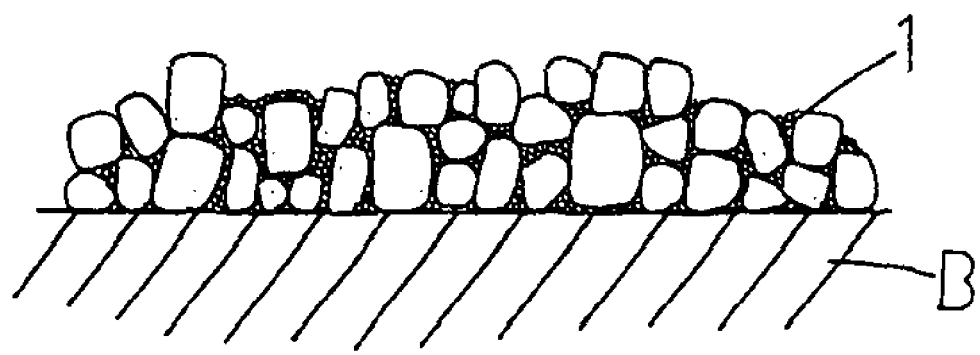
FIG. 2 is a schematic view showing that a nano glaze of the present invention is sprayed onto the surface of a ceramic body.

The glaze (1) completed is used to cover up the surface of a ceramic body or biscuit (B) as illustrated in FIG. 2 and sintered at a temperature of 1120° C.~1350° C. into a finished ceramic product in the form of container for the edibles, filter materials, building materials, sanitary ware and even petrol-product activators that are provided with far infrared emitting function and nano characteristics.

When in practical use, the ceramic product by preventing attachment of dust, oil stain or other contaminants due to the characteristics of nano materials always keeps a clean, bright and attractive appearance while providing antibiotic results to prevent attachment and propagation of virus and bacteria, particularly applicable to stool and urinal to avoid propagation of bacteria in the excrement and urine. The ceramic product applied with the glaze of the present invention gives more aggressive antibiotic results than the sterilization by the prior art, and is more effectively in preventing the diffusion of epidemic diseases.

Furthermore, the far infrared emitting function of the ceramic product applied with the glaze of the present invention is capable of activating the characteristics of a substance contained or passing through the ceramic product, thus to upgrade the functions of the substance. The use of zirconium as the far infrared powder for the present invention not only allows versatile colors for the surface of the ceramic product but also permits an accelerated emission rate to shorten the reaction time down to 1~3 sec. As proved by experts, the far infrared emission gives the following features:

1. The emission relates to a radiation wave, meaning it transmits without having to rely upon the air;
2. Its power of permeation is capable of directly reaching the epidemic tissues of human being, thus to improve one's physical condition forthwith from within the skin; and
3. Its emission features consonance and absorption. Since the wavelength of the far infrared can be managed to stay close to that needed by human body (approximately 4~50 μm), an object when exposed to the far infrared develops resonance and consonance by the moles inside the object to facilitate the absorption by the human body to promote activation of physical mechanism.

Meanwhile, the far infrared provides the following direct benefits to human body:

1. Promoting metabolism: thus to help maintain good circulation, normal blood pressure, and harmonize the central nerve system, discharge stubborn hazardous substances inside one's body, and stay healthy;
2. Preventing Development of Cancerous Cells: Far infrared applied "Luke Warm Therapy" has become one of the most significant contribution to human being in the medical history that effectively inhibit the growth and wipe out cancerous cells;
3. Preventing and slowing down aging process: once the cells are activated, one maintains normal metabolism and keeps the pores on the skin clean of residual make-ups or the dust in the air; and
4. Upgrading the rejuvenation power of one's cells: once the rejuvenation power of cells are activated, one keeps a sound mind, and improved immunity, thus doing significant help in one's reproduction ability.

Trial production using the glaze of the present invention has been completed. Wherein, when the product is applied in the manufacturing of a water container, tea or wine is respectively poured into a cup made glazed with the present invention and into another cup of regular ceramic cup. After 1~3 second of reaction time, one could easily taste the different in the quality of the tea or wine between both cups.

When the present invention is applied in the making of the filter for a cigarette, the filter will not absorb the tar due to the action of the far infrared, thus to keep the tar in the filter, and further to keep one from smoking into too much tar. A smoker can immediately tell the difference between the regular filter and the filer applied with the glaze of the present invention on taking first smoke.

The ceramic teacup applied with the glaze of the present invention from the trial production is separately tested with pencil and vegetarian oil. Reciprocal scratching with the pen on the surface of the teacup leaves no marks; and pouring of vegetarian oil into the teacup is not observed with any attachment of the oil to the glazed teacup.

Whereas, the glaze of the present invention is sintered together with the ceramic body or biscuit into an integral ceramic product, the far infrared emitting function and nano characteristics of the present invention constantly stay with the ceramic product and will not decay due to the use of the ceramic product for a longer time.

The far infrared emitting nano glaze of the present invention for allowing to cover up the surface of a ceramic body or biscuit and sintered together into a finished ceramic product provided with the far infrared emitting function and nano characteristics helps maintain clean, bright and attractive surface of the ceramic product, provide antibiotic results by preventing attachment and propagation of virus and bacteria, and consistently activate molecular characteristics of a substance contained in or passing through the ceramic product to upgrade the function of the substance. Therefore, this application for a utility patent is duly filed. However, it is to be noted that it is to be noted that the those preferred embodiments and accompanying drawings disclosed above do not in any way limit the technical scope by the present invention; and any other arts involving same or similar structure, installation, and/or characteristics to that of the present invention shall be deemed as falling within the purpose of and claims made in the present invention.

I claim:

1. A far infrared emitting glaze is comprised of a mixture containing 35~65% solvent, 1~35% solubilizing agent, 0~25% refractory agent but not including 0%, 0.1~5% adhesive agent, 0.5~30% far infrared powder, and 0.5~10% nano material, added with water to be ground into a solution with of 350±20 g/200 cc concentration and 200~325 mesh fineness; and the solution being applied to a surface of a ceramic body or biscuit and sintered together with the ceramic body or biscuit at 1120° C.~1350° C. into a finished ceramic product; wherein, the solvent selected from the group consisting of feldspar, quartz powder and boron; the solubilizing agent selected from the group consisting of calcium carbonate, barium carbonate, lithium carbonate, magnesium carbonate, zinc oxide, and talc; the refractory agent selected from the group consisting of kaolin and silica.

2. The far infrared emitting glaze as claimed in claim 1, wherein, the adhesive agent is selected from the group consisting of silicon dioxide, magnesium oxide, sapphire, ferric oxide, calcium oxide, sodium oxide, potassium oxide, and lithium oxide.

3. The far infrared emitting glaze as claimed in claim 1, wherein, the adhesive agent comprises 38.42% silicon dioxide, 17.13% magnesium oxide, 0.69% sapphire, 0.11% ferric oxide; 3.25% calcium oxide, 4.96% sodium oxide, 0.07% potassium oxide, 0.72% lithium oxide, and 24.84% inorganic epoxy.

4. The far infrared emitting glaze as claimed in claim 1, wherein, the nano material is selected from the group consisting of silver, silicon, aluminum, sodium, potassium, magnesium, calcium, titanium, iron, and lithium.

5. The far infrared emitting glaze as claimed in claim 1, wherein the nano material is an oxide of the compound of elements selected from the group consisting of silver, silicon, aluminum, sodium, potassium, magnesium, calcium, titanium, iron, and lithium.

6. The far infrared emitting glaze as claimed in claim 1, wherein, the far infrared powder is a natural mineral.

7. The far infrared emitting glaze as claimed in claim 1, wherein, the far infrared powder is zirconium dioxide.

8. The far infrared emitting glaze as claimed in claim 1, wherein, the far infrared powder is selected from the group consisting of $Al_2O_3$, $MgO$, $NiO$, $ZnO$, $SnO_2$, $TiO_2$, $CaCO_3$, $ZrC$, $SiC$, $SiO_2$ and zirconium silicate.

* * * * *